`US005777311A`

United States Patent [19]
Keinath et al.

[11] Patent Number: 5,777,311
[45] Date of Patent: Jul. 7, 1998

[54] OPTOELECTRONIC A DEVICE EMPLOYING A DIGITAL FILTER WHICH OPERATES IN DIFFERENT COEFFICIENT SETS

[75] Inventors: Armin Keinath, Dettingen; Jörg Wörner, Filderstadt, both of Germany

[73] Assignee: Leuze electronic GmbH +Co., Owen-Teck, Germany

[21] Appl. No.: 564,157

[22] PCT Filed: Mar. 16, 1995

[86] PCT No.: PCT/EP95/00992

§ 371 Date: Dec. 21, 1995

§ 102(e) Date: Dec. 21, 1995

[87] PCT Pub. No.: WO95/29457

PCT Pub. Date: Nov. 2, 1995

[30] Foreign Application Priority Data

Apr. 26, 1994 [DE] Germany ............... 44 14 449.0

[51] Int. Cl.⁶ ............................................. G06K 7/10
[52] U.S. Cl. ................... 235/462; 235/466; 235/467; 250/235; 250/568
[58] Field of Search ..................... 235/462, 463, 235/466, 467, 470, 472; 250/235, 234, 236, 566, 568

[56] References Cited

U.S. PATENT DOCUMENTS

| | | | |
|---|---|---|---|
| 4,323,772 | 4/1982 | Serge | 235/463 |
| 4,761,544 | 8/1988 | Poland | 235/466 X |
| 4,855,581 | 8/1989 | Mertel et al. | 235/462 |
| 5,140,146 | 8/1992 | Metlitsky et al. | 235/462 |
| 5,196,683 | 3/1993 | Marom et al. | 235/462 |
| 5,371,361 | 12/1994 | Arends et al. | 235/467 X |

FOREIGN PATENT DOCUMENTS

| | | |
|---|---|---|
| 0 036 951 | 10/1981 | European Pat. Off. |
| 0 433 593 | 11/1991 | European Pat. Off. |
| 0 574 024 | 12/1993 | European Pat. Off. |

*Primary Examiner*—Doanld T. Hajec
*Assistant Examiner*—Michael G. Lee
*Attorney, Agent, or Firm*—Spencer & Frank

[57] ABSTRACT

An optoelectronic device for identifying a mark having a defined contrast pattern includes a transmitting element for emitting a beam of transmitted light. A deflector unit periodically guides the transmitted light beam over the mark. A receiving element receives the transmitted light beam after being reflected by the mark and produces an analog received signal which exhibits an amplitude modulation impressed by the contrast pattern of the mark and is dependent on the spatial intensity distribution of the transmitted light beam. An n-bit analog-digital converter has a word width greater than 1 for converting the analog received signal into a digital received signal. A digital filter includes an input for receiving the digital received signal. The digital filter has different coefficient sets that are temporally changed, wherein the coefficients of each coefficient set are selected so that a transmission characteristic of the filter for each coefficient set essentially corresponds to an inverse of the frequency spectrum of the spatial intensity distribution of the transmitted light beam at a respectively different distance from the device.

10 Claims, 9 Drawing Sheets

FIG. 1
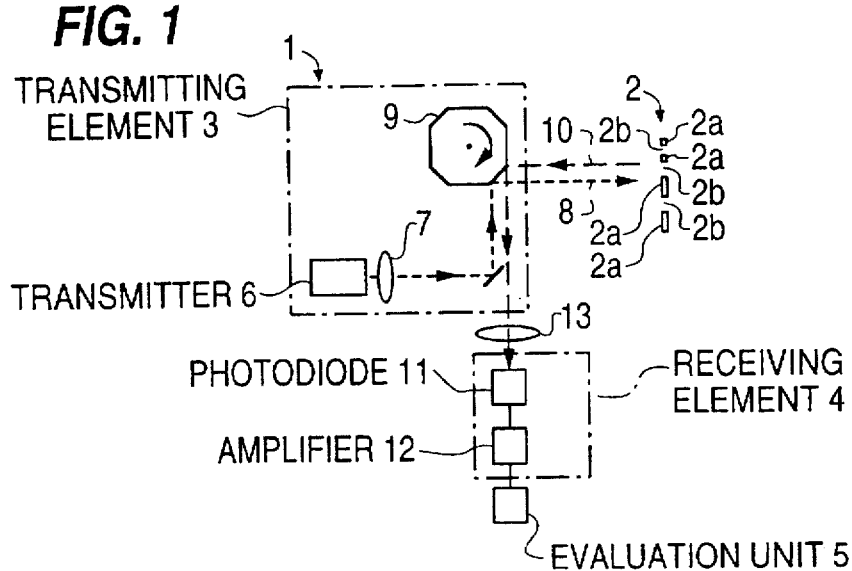
FIG. 2
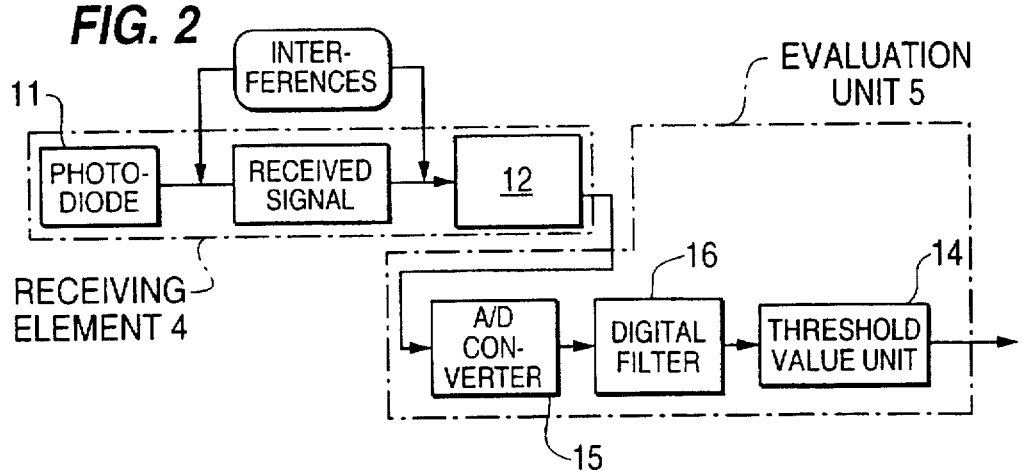
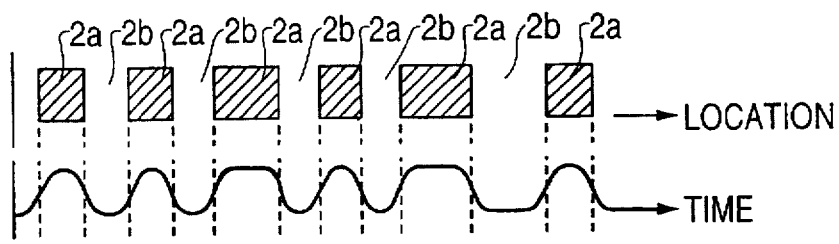
FIG. 3a → LOCATION
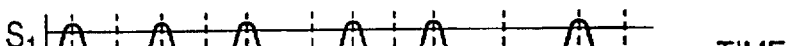
FIG. 3b → TIME
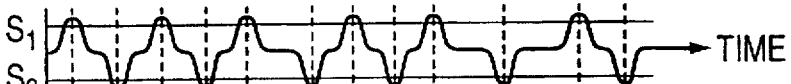
FIG. 3c   $S_1$   $S_2$ → TIME
FIG. 3d → TIME

OPTOELECTRONIC A DEVICE EMPLOYING A DIGITAL FILTER WHICH OPERATES IN DIFFERENT COEFFICIENT SETS

The invention relates to an optoelectronic device for identifying a mark having a defined contrast pattern comprising a transmitting element for emitting a beam of transmitted light; a deflector unit for periodically guiding the transmitted light beam over the mark; and a receiving element for receiving the transmitted light beam after being reflected by the mark and producing an analog received signal which exhibits an amplitude modulation impressed by the contrast pattern of the mark and dependent on the spatial intensity distribution of the transmitted light beam.

A device of this type is disclosed in EP 0 433 593 A2. The device is embodied as a bar code reader for scanning bar code symbols.

The bar code symbols comprise a succession of light and dark line elements of a predetermined width. The bar code symbols are scanned by the device by means of a transmitted light beam, preferably a laser beam. The transmitted light beam has a mean diameter perpendicular to the direction of propagation and corresponding to its spatial intensity distribution. In laser beams, the spatial intensity distribution ideally corresponds to a Gaussian distribution.

The diameter of the transmitted light beam varies with the distance from the device, depending on the transmitting lens preceding the transmitting element. In the focal plane of the transmitted light beam, the diameter of the transmitted light beam is typically considerably smaller than the width of the line elements. Consequently, the amplitude modulation of the received signal is virtually identical to the widths of the line elements of the bar code symbol so that the symbol can be reliably recognized by the device.

As the distance between the bar code symbol and the focal plane of the transmitted light beam increases, the diameter of the transmitted light beam increases rapidly. As soon as the diameter of the transmitted light beam is of the same order of magnitude as the widths of the line elements of the bar code symbols, the modulation of the received signal is influenced by the width of the transmitted light beam such that reliable detection of the bar code symbol is impeded, or is no longer possible.

As described in EP 0 433 593 A2, as the diameter of the transmitted light beam increases, the high-frequency components of the modulated received signal, which derive from the narrow line elements of the bar code symbol, are increasingly suppressed.

If the amplitudes of the high-frequency components of the received signal are too strongly suppressed in proportion to the amplitudes of the low-frequency components of the received signal, the bar code symbol can no longer be read by the device.

To compensate for this effect, the device of EP 0 433 593 A2 is provided with an analog filter with which the analog received signal is filtered such that the high-frequency components are amplified to a greater degree than the low-frequency components.

Four frequencies, $f_0$, $f_1$, $f_2$ and $f_3$, are defined for the purpose of determining the transmission characteristic of the filter.

In each of the regions between two adjacent frequencies, one specific amplification factor is chosen, and the amplification factors become greater as the frequency increases. For a certain diameter of the transmitted light beam, the transmission characteristic of the filter can be permanently set. Alternatively, the transmission function of the filter can be altered by shifting the frequencies $f_0$, $f_1$, $f_2$ and $f_3$.

This shift is suitably done as a function of the frequency that corresponds to the narrow line elements of the bar code symbol.

One substantial disadvantage of this device resides in the coarse graduation of the frequency spectrum of the received signal. As a result, the influence of the transmitted light beam diameter on the modulation of the received signal can be detected only incompletely. Hence the received signal can only be optimized to a limited extent by means of the analog filter.

Another disadvantage of this device is that the transmission function of the analog filter can be optimized only for a specific distance. At various reading distances, the frequencies $f_0$, $f_1$, $f_2$ and $f_3$ must be varied, and the change in the frequencies is done by means of an additional sensor system, which by way of example measures the signal frequencies of the received signals deriving from the narrow lines. This entails considerable additional expense for circuitry.

SUMMARY OF THE INVENTION

An object of the invention is to configure a device of the type referred to at the outset such that the marks can be reliably recognized within a large reading range with the least possible outlay for equipment.

The above and other objects are accomplished in accordance with the invention by providing an optoelectronic device for identifying a mark having a defined contrast pattern, comprising: a transmitting element for emitting a beam of transmitted light; a deflector unit for periodically guiding the transmitted light beam over the mark; a receiving element for receiving the transmitted light beam after being reflected by the mark and producing an analog received signal which exhibits an amplitude modulation impressed by the contrast pattern of the mark and dependent on the spatial intensity distribution of the transmitted light beam; an n-bit analog-digital converter having a word width greater than 1 for converting the analog received signal into a digital received signal; and a digital filter including an input for receiving the digital received signal, the digital filter having different coefficient sets that are temporally changed, wherein the coefficients of each coefficient set are selected so that a transmission characteristic of the filter for each coefficient set essentially corresponds to an inverse of the frequency spectrum of the spatial intensity distribution of the transmitted light beam at a respectively different distance from the device.

The basic concept of the invention is that different sets of coefficients are successively read into the digital filter at predetermined time intervals. Each of the coefficient sets is selected such that the marks can be reliably recognized with the device in a predetermined distance range from the device, the so-called depth-of-focus range.

The alteration of the coefficient sets of the digital filter is preferably effected periodically, during which the switching frequency of the coefficient sets corresponds to the scanning rate of the deflection unit. The scanning rates are preferably in the order of magnitude of $10^{-3}$ sec. This means that the marks only move very slowly in comparison to the scanning speed, so that a mark is measured in a specific position with different settings of the digital filter.

Typically, marks disposed on objects that are, for example, transported on conveyor belts, are moved past the device at speeds in the range of a few m/sec.

A specific reading range results for each of the different settings of the digital filter. For the mark to be identified, it need only be recognized at one setting of the coefficients of the filter, because the position of the mark does not change during the individual measurements. For the result, the depth-of-focus ranges for the individual measurements add up to a total depth-of-focus range which is considerably larger than the individual ranges.

It is useful to use only two different coefficient sets, so that a short period duration of switching of the coefficient sets is assured. The coefficient sets are selected such that the resulting depth-of-focus ranges adjoin one another seamlessly, so the individual ranges add up to a gapless total depth-of-focus range, within which the marks can be reliably recognized.

Each coefficient set of the digital filter is selected such that the disturbances of the received signal caused by disturbances dictated by components and by the finite diameter of the transmitted light beam are compensated at a predetermined distance range from the device.

For this purpose, an n-bit analog-digital converter is disposed downstream of the receiving element. This converter converts the analog received signal into a digital signal. The resolution of the analog-digital converter, that is, its word width, is advantageously selected to be as large as possible. By means of this, a loss of information during the conversion of the analog signal into a digital signal is extensively avoided.

The compensation of the distortions of the received signal is effected by a suitable selection of the transmission function of the digital filter to which the digitized received signal is fed.

In the determination of the transmission function of the digital filter, the transmission functions of the signal-distorting components, particularly of the receiving element, and the frequency spectrum of the spatial intensity distribution of the transmitted light beam are taken into consideration. Because of this, the disturbing influences can be precisely detected and compensated over the entire frequency range, by means of which the geometry of the light-dark surfaces of the marks can be reconstructed very precisely from the amplitude characteristic of the received signal.

The coefficient sets of the digital filter are advantageously obtained with a computer-assisted variation method. In this instance, the variation of the coefficients of the filter takes place until the received signal coincides, within a predetermined degree of precision, with the actual contrast pattern of the marks in the respective predetermined reading range.

BRIEF DESCRIPTION OF THE DRAWINGS

The invention will be described below in conjunction with the drawings. FIG. 1 is a schematic and block diagram showing a basic layout of an optoelectronic device according to the invention.

FIG. 2 is a block circuit diagram of the evaluation unit of the optoelectronic device of FIG. 1.

FIG. 3a illustrates a bar code symbol.

FIG. 3b is a pulse diagram showing the received signal at the input of the threshold value unit.

FIG. 3c is a pulse diagram showing a differentiated received signal.

FIG. 3d is a pulse diagram showing the binary received signal train at the output of the threshold value unit.

DETAILED DESCRIPTION OF THE PREFERRED EMBODIMENTS

Figure 4:
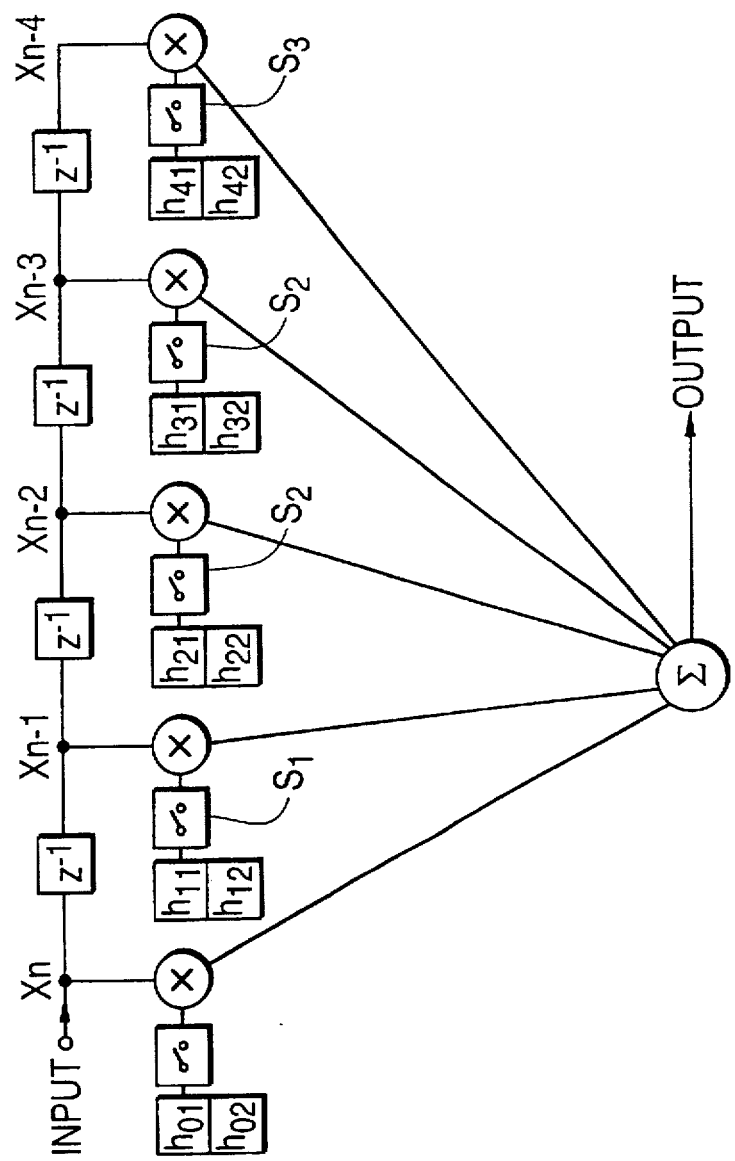
FIG. 4 is a block circuit diagram of a FIR filter.

In FIG. 1, the basic layout of an optoelectronic device 1 for detecting marks provided with defined contrast patterns is shown. In principle, the marks may have arbitrary sequences and shapes of light and dark surfaces adjacent to one another, preferably black and white surfaces. The invention will be described below for the case where the marks are formed by bar code symbols 2. The bar code symbols 2 essentially comprise a succession of black and white line elements 2a, b of defined length and width.

The optoelectronic device 1 substantially comprises a transmitting element 3, a receiving element 4, and an evaluation unit 5. The transmitting element 3 comprises a transmitter 6, preferably a laser diode, and a transmitting lens 7, preceding the transmitter 6, for focusing the transmitted light beam 8. The focused transmitted light beam 8 is deflected via a deflector unit 9, which in the present exemplary embodiment is formed by a rotating polygonal mirror wheel, and guided across the bar code symbol 2 to be detected. The axis of rotation of the polygonal mirror wheel is perpendicular to the equatorial plane of the polygonal mirror wheel shown in FIG. 1.

The received light 10 reflected by the bar code symbol 2 is guided to the receiving element 4 via the polygonal mirror wheel. The receiving element 4 comprises a photodiode 11, in which the received light 10 is converted into an electronic received signal, and an amplifier 12 that follows the diode. To improve the sensitivity of detection, a receiving lens 13 precedes the receiving element 4.

The received signal present at the output of the receiving element 4 is fed to the evaluation unit 5.

The principle by which the received signals are evaluated can be seen from FIG. 3. FIG. 3a shows a bar code symbol 2 with a succession of black and white line elements 2a, b. In the event that the diameter of the transmitted light beam 8 on the bar code symbol 2 is substantially smaller than the smallest width of one line element 2a, b, the transmitted light beam 8 is amplitude-modulated, as shown in FIG. 3b, by the reflection from the bar code symbol 2.

In the event that no distortions or skewings of the received signal take place in the receiving element 4, the curve course shown in FIG. 3b corresponds to the received signal present at the output of the receiving element 4.

The determination of the width of the individual line elements 2a, b of the bar code symbol 2 in the evaluation unit 5 is suitably done by the turning point process.

In a first step, the received signal is differentiated (FIG. 3c). Next, the extremes of the differentiated received signal are determined which correspond to the turning points of the received signal. These turning points in turn define the transitions from a black to a white line element 2a, b and vice versa.

To determine the turning points of the received signal, the differentiated received signal is converted, with preferably two switching thresholds $S_1$ and $S_2$ (FIG. 3c) into a binary signal train (FIG. 3d). The duration of the states "0" and "1" of the binary signal train is a measure for the width of the line elements 2a, b of the bar code symbol 2. The duration of the states "0" and "1" can be detected in a simple way via a clock-controlled counter.

As the diameter of the transmitted light beam 8 becomes greater or with increasing signal distortions in the receiving element 4, the edge errors also become greater; that is, the turning points of the received signal no longer coincide with the location coordinates of the black-white transitions of the bar code symbol 2. In an extreme case, this means that a bar code symbol 2 can no longer be recognized.

One measure for the deviation of the received signal from the actual contrast pattern is known as the decoding reliability DS.

In an ideal bar code reader without signal-distorting components and with an infinitely sharply focused transmitted light beam 8, there is a perfect match between the locations of the turning points of the received signal and the locations of the black-white transitions of the bar code symbol 2. This corresponds to the value DS=1. A bar code symbol 2 can be recognized reliably by the device 1.

As the disturbing influences become greater, the differences between the locations of the turning points of the received signal and the locations of the black-white transitions of the bar code symbol 2 become greater; that is, the decoding reliability DS becomes lower.

In an actual bar code reader, the component-dictated disturbing influences or the diameter of the transmitted light beam 8 can be so great that line elements 2a, b of the bar code symbol 2 with different width ratios result in a received signal with equidistant turning points. In this case, line elements 2a, b of different width can no longer be recognized. The decoding reliability in this case is DS=0.

To eliminate these signal distortions, or in other words to increase the decoding reliability, the threshold value unit 14 is preceded in the evaluation unit 5 by the analog/digital converter 15 and the digital filter 16.

The n-bit analog/digital converter 15 has a word width in the range of n=8 to 12. In the present exemplary embodiment, a 10-bit analog/digital converter 15 is used. As a result, the analog received signal can be converted with high resolution into a digitized received signal.

The digital filter 16 is formed by an FIR filter. The layout of the FIR filter is illustrated in FIG. 4. The output quantity $y_n$ of the FIR filter is a function of the input quantity $x_m$ (m=n, n−1, n−2, ..., n−M) at different times m.

$$Y_n = \sum_{m=0}^{M} h_{mi} x_{n-m} (i = 1,2)$$

The variable z represented in FIG. 4 is the variable conjugated in the frequency range for the time variable n. The quantity $z^{-1}$ represents the amount of the delay between two linking points, e.g. $x_n$ and $x_{n-1}$. The symbols X and Σ characterize a multiplicative and additive linking, respectively, which is realized by a multiplier and an adder, respectively.

The weighting of the input quantity is effected with adjustable coefficients $h_{mi}$. The index m indicates the time rank of the filter 16. In the present case, an 18th degree filter is used, i.e., the number of coefficients m of the filter 16 is M=18; consequently, the index m varies in the range of m=0, 1, 2, ... 17.

The index i serves to distinguish between the different coefficient sets. In the present embodiment, two different coefficient sets (i=1,2) are used.

Each of the coefficients $h_{mi}$ is stored in a storage element in the digital filter 16. The storage elements are characterized by the coefficients hmi themselves in FIG. 4.

The outputs of the storage elements for the coefficients $h_{mi}$ of different coefficient sets i, which are associated with the same time rank m, are connected to a switch $S_m$. The output of the switch $S_m$ is in turn connected to the multiplier X, which is associated with the time rank m in the network of the digital filter.

Because of the switching of the switches $S_m$ (m=0, 1, 2, ... 17), the different coefficient sets $h_{mi}$ (i=1,2) are successively read into the network of the digital filter 16.

This switching takes place periodically by means of a computer unit, not shown. In the process, the switching frequency of the coefficients $h_{mi}$ equals the scanning rate of the deflection unit. Thus, the device is operated with different coefficient sets in consecutive scanning cycles.

The scanning rate lies in the order of magnitude of $10^{-3}$ sec. This rapid switching of the coefficients ensures that each mark is measured in a predetermined position with both coefficient sets.

The digitized and filtered received signal is fed to the threshold value unit 14 and converted there into a binary signal train.

The transmission function for each coefficient set of the digital filter 16 is configured such that signal distortions of the received signal which are caused by components or by the finite diameter of the transmitted light beam 8 can be eliminated.

These disturbing quantities are, however, not constants; rather, they are dependent on a number of external factors. The influence of the diameter of the transmitted light beam 8 on the decoding reliability is a function of the ratio of the diameter of the beam to the widths of the line elements 2a, b of the bar code symbol 2. Moreover, the diameter of the transmitted light beam 8 is a function of the distance d of the bar code symbol 2 from the device 1. Finally, the configuration of the signal-distorting components influences the magnitude of the disturbing signals.

Figure 5:
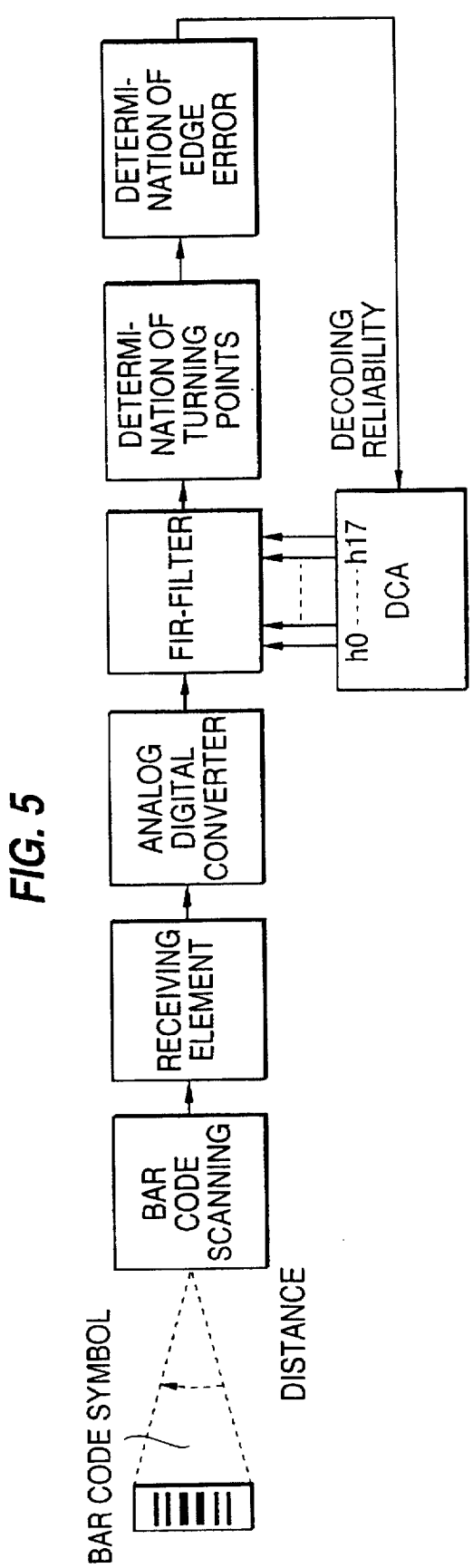
FIG. 5 is a flow chart for determining the coefficient sets of the digital filter, of FIG. 4.

In the determination of the coefficients $h_{mi}$ of the digital filter 16, these influencing quantities are taken into account within the framework of an overall model for the device 1, with a separate overall model being created for the determination of each coefficient set. The coefficients are determined on the basis of this overall model using a systematic variation. The flow chart for determining the coefficients $h_{mi}$ of the digital filter 16 is shown in FIG. 5.

The bar code reader is connected to a computer unit, not shown, and at predetermined distances d detects bar code symbols 2 that have line elements 2a, b of defined width ratios.

The received light 10 that as a result of the scanning of the bar code symbol 2 strikes the receiving element 4 is converted there into the received signal. This received signal has signal distortions, which are caused by the receiving element 4 and by the finite diameter of the transmitted light beam 8.

As a result, the received signal includes not only information about the contrast pattern of bar code symbol 2, but also information about the transmitted light beam 8 and the receiving element 4. This received signal is digitized in the analog/digital converter 15 and supplied to the FIR filter and finally to the computer unit. In addition, the contrast pattern of the bar code symbol 2 is stored in the computer unit.

In the computer unit, the locations of the turning points of the received signal are ascertained and compared with the positions of the transitions from black to white line elements 2a, b. From the deviation between these positions, the decoding reliability of the device 1 is ascertained.

Figure 9A:
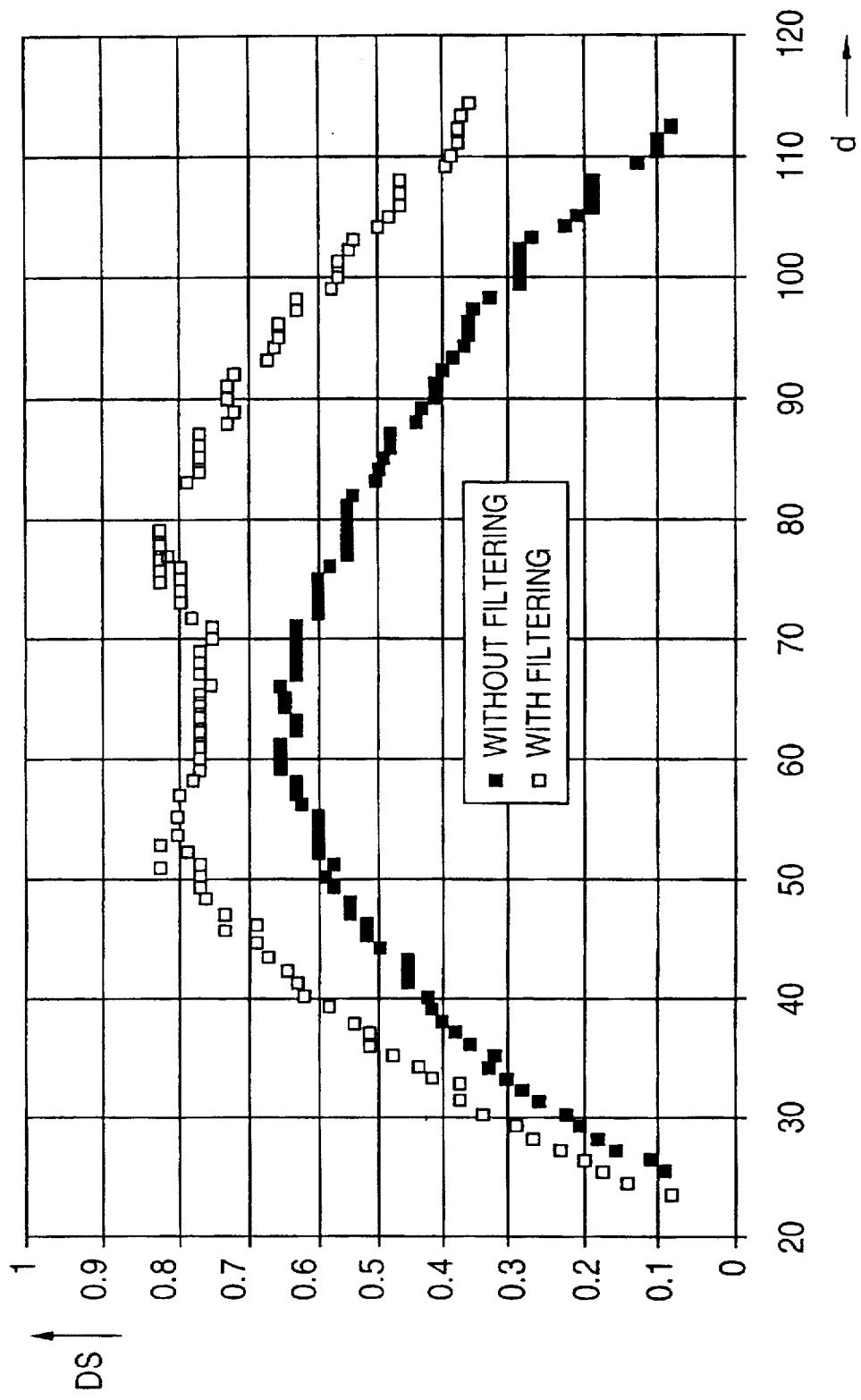
FIG. 9a is a graph showing the decoding reliability of the device with or without optimization of the digital filter with the first coefficient set.
Figure 9B:
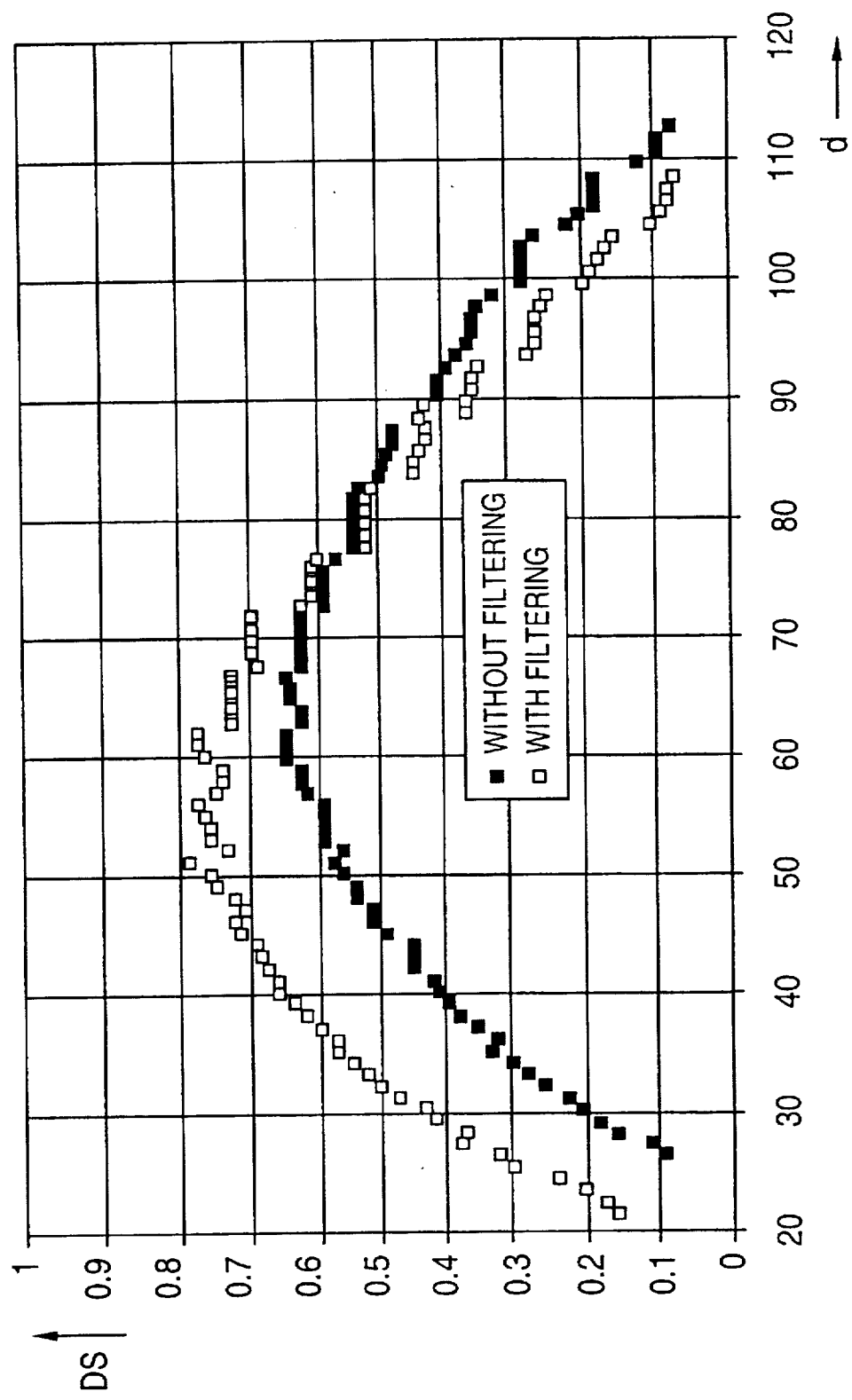
FIG. 9b is a graph showing the decoding reliability of the device with and without optimization of the digital filter with the second coefficient set.

This process is repeated for different reading distances, so that the decoding reliability is present in the computer unit as a function of the reading distance d. The decoding reliability determined in this manner as a function of the reading distance is illustrated in FIGS. 9a and 9b.

The two coefficient sets $h_{mi}$ (i=1,2) of the digital filter are optimized separately for different reading distances. Consequently, the decoding reliability for the different coefficient sets is determined for different ranges of the reading distances (lower curves in FIGS. 9a and 9b).

The coefficients $h_{mi}$ of the filter 16 are set at predetermined values which constitute the initial condition for the subsequent variation method. The value of one of the coefficients $h_{mi}$ of the filter 16 is advantageously set to 1 as an initial condition, while the remaining coefficients $h_{mi}$ assume the value 0.

The variation of the coefficients $h_{mi}$ of the FIR filter is effected in the computer unit according to the method of design centering (design centering analysis=DCA ). The decoding reliability ascertained beforehand as a function of the distance d is used as the input value. With this information, the coefficients $h_{mi}$ of the FIR filter are altered according to the random principle. Then those sets of parameters are stored which lead to a decoding reliability exceeding a predetermined minimum value.

Figure 6:
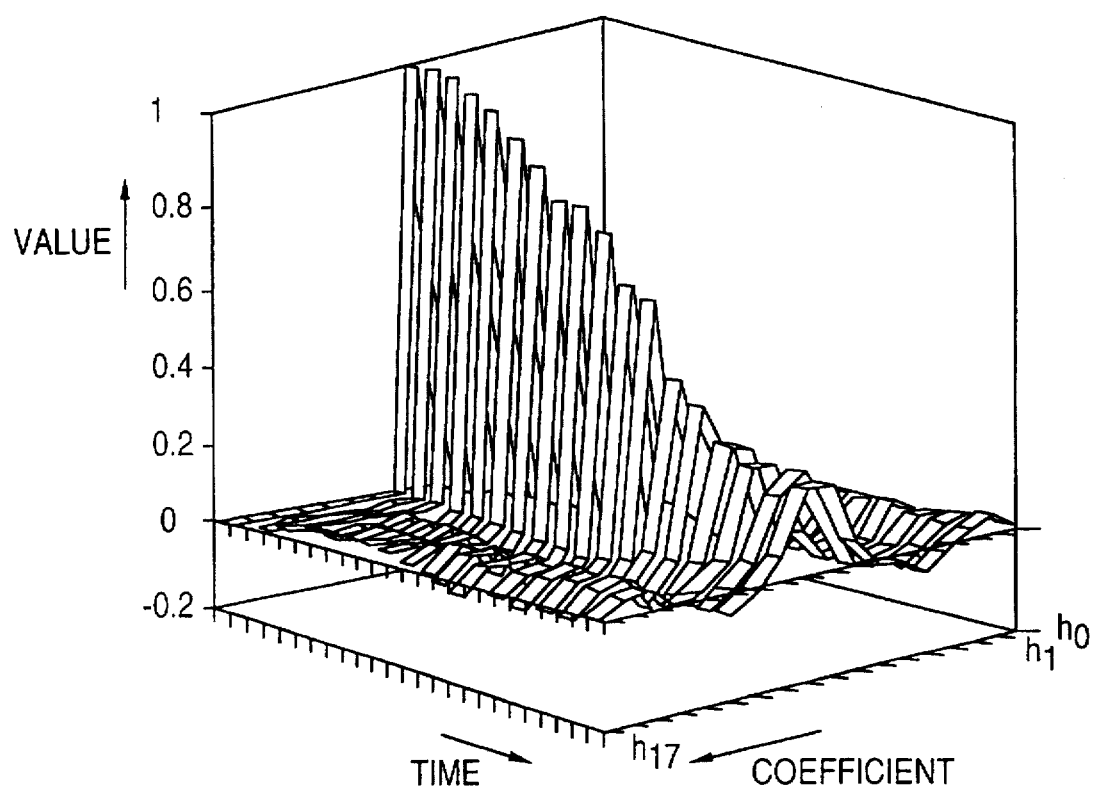
FIG. 6 is a graph showing time dependency of the coefficients of the digital filter during the variation of the coefficients.

This method is repeated in a plurality of iteration steps, in which the decoding reliabillity ascertained in the computer unit for the previous iteration step is used for the current iteration step. The iteration is halted when the decoding reliability exceeds a predetermined desired value. The variation over time in the coefficients of the FIR filter during the individual iteration steps is illustrated schematically in FIG. 6.

The optimization of the coefficient sets of the filter 16 is not only effected for one reading distance, but for the respective predetermined distance range, where the desired value for the decoding reliability must be attained for every reading distance.

Figure 7A:
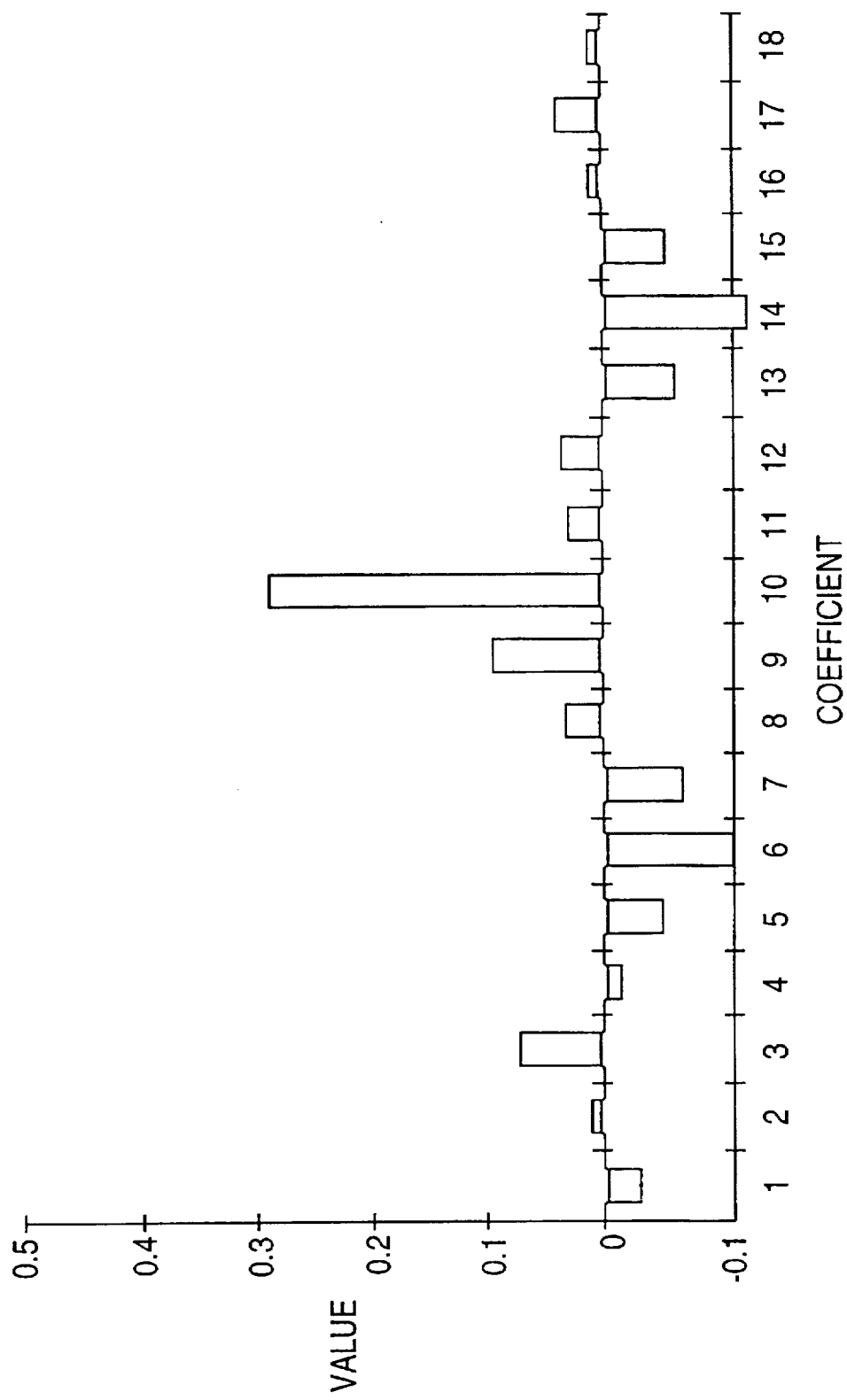
FIG. 7a is a graph showing the first coefficient set of the digital filter following the variation of the coefficients.
Figure 7B:
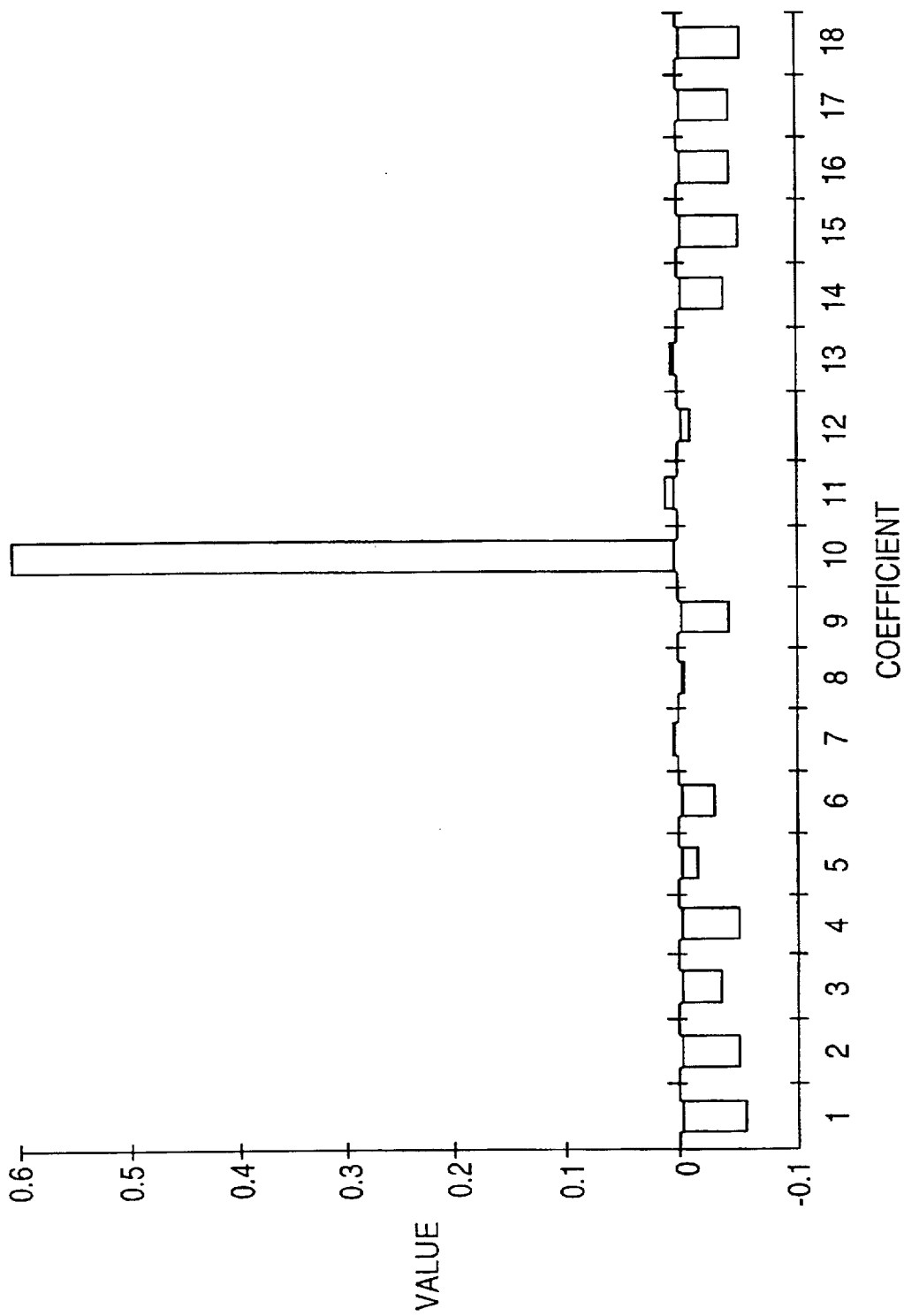
FIG. 7b is a graph showing the second coefficient set of the digital filter following the variation of the coefficients.

The optimized sets of the coefficients $h_{mi}$ of the digital filter 16 are shown in FIGS. 7a and 7b. The coefficients are configured asymmetrically with respect to the center point or to the vertical center line. Phase distortions of the received signal that are caused by the receiving element 4 are eliminated by the asymmetrical component of the coefficients $h_{mi}$.

The symmetrical component of the coefficients $h_{mi}$ eliminate amplitude distortions in the received signal that are caused by the finite diameter of the transmitted light beam 8 and the receiver element 4.

Figure 8A:
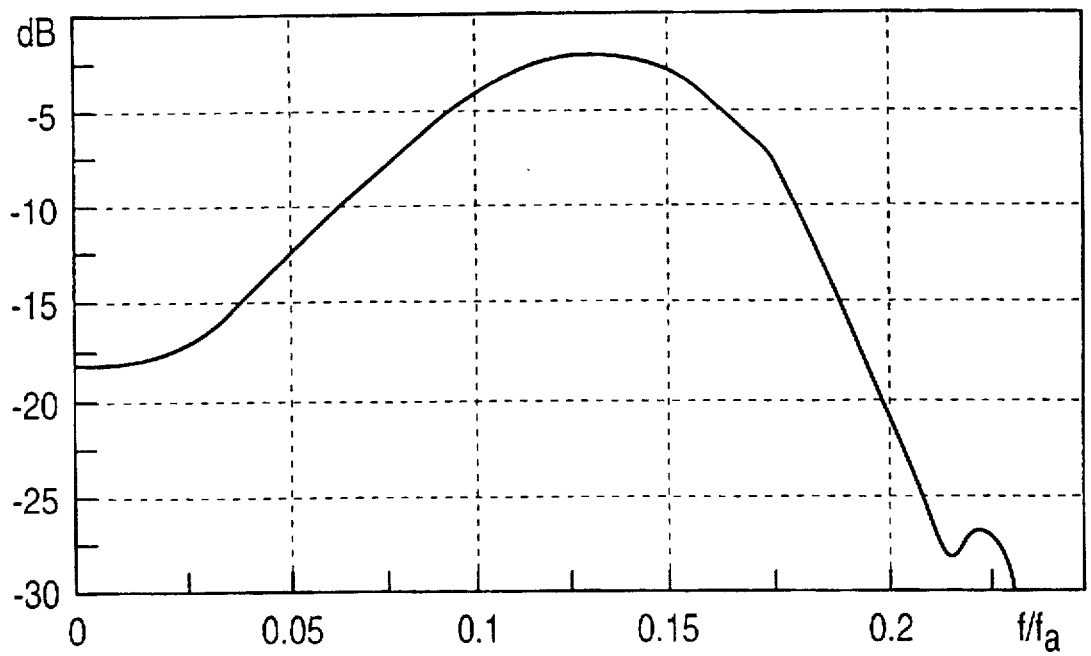
FIG. 8a is a graph showing the transmission function for the first coefficient set of the optimized digital filter.
Figure 8B:
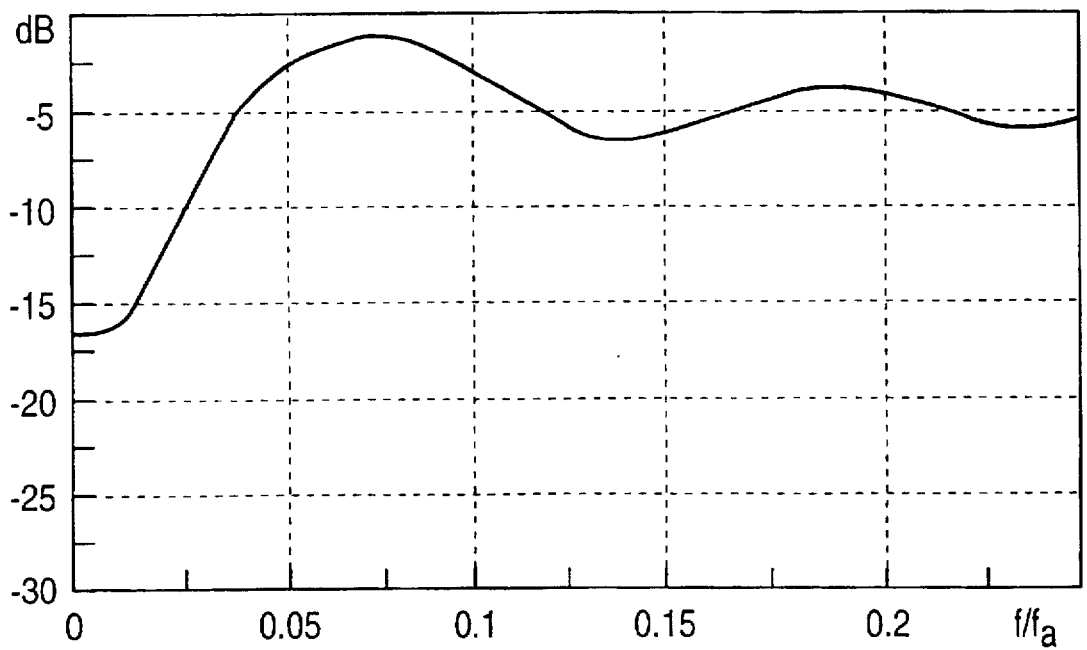
FIG. 8b is a graph showing the transmission function for the second coefficient set of the optimized digital filter.

Represented in FIGS. 8a and 8b are the transmission functions of the digital filter 16 resulting from the Fourier-transform of the coefficient sets of the digital filter 16 according to FIGS. 7a and 7b. In the present embodiment, the frequency $f_a$ is $f_a$=10 MHz.

The transmission functions essentially correspond to the inverses of the frequency spectra of the spatial distributions of the transmitted light beam 8 in the predetermined ranges of the reading distances, which essentially correspond to Gaussian characteristics. Deviations therefrom stem from the signal distortions due to the receiving element 4.

This means that by the experimental detection of all the external system quantities over the entire frequency range, their influence on the received signal can be detected accurately and eliminated by the variation method.

The values for the decoding reliability that were obtained with the optimized coefficient sets are illustrated in FIGS. 9a and 9b (upper curves). For the first coefficient set, a decoding reliability above 0.6 results for reading distances in the range of 36 cm<d<104 cm. The bar code symbols 2 can be identified reliably above this limit value (FIG. 9a).

For the second coefficient set, a decoding reliability above 0.6 results for reading distances in the range of 30 cm<d<87 cm.

The depth-of-focus range is increased to 30 cm<d<104 by the switching of the coefficient sets in the digital filter 16.

Following optimization of the coefficients $h_{mi}$ of the digital filter 16, the computer unit is disconnected from the device 1. During operation of the device 1, the optimized coefficient sets $h_{mi}$ of the digital filter 16 are maintained. There is no need to readjust the coefficients $h_{mi}$ of the digital filter 16 and hence the transmission functions because the coefficients $h_{mi}$ were optimized for different reading distances d and bar code symbols 2, and a considerably increased depth-of-focus range is obtained through the switching between the coefficient sets.

We claim:

1. An optoelectronic device for identifying a mark having a defined contrast pattern, comprising:

a transmitting element for emitting a beam of transmitted light;

a deflector unit for periodically guiding the transmitted light beam over the mark;

a receiving element for receiving the transmitted light beam after being reflected by the mark and producing an analog received signal which exhibits an amplitude modulation impressed by the contrast pattern of the mark and dependent on the spatial intensity distribution of the transmitted light beam;

an n-bit analog-digital converter having a word width greater than 1 for converting the analog received signal into a digital received signal;

a digital filter including an input for receiving the digital received signal, the digital filter operating in successive time intervals according to different coefficient sets, wherein the coefficients of each coefficient set are selected so that a transmission characteristic of the filter for each coefficient set essentially corresponds to an inverse of the frequency spectrum of the spatial intensity distribution of the transmitted light beam at a respectively different distance from the device.

2. A device according to claim 1, wherein the deflector unit has a scanning rate and the coefficient sets of the digital filter are switched periodically with a switching frequency corresponding to the scanning rate of the deflector unit.

3. A device according to claim 1, wherein two different coefficient sets are successively allocated to the digital filter at predetermined time intervals.

4. A device according to claim 1, wherein the digital filter comprises an 18th degree FIR filter having coefficients ($h_{mi}$).

wherein (i) identifies the coefficient set and (m) is the time rank of the filter.

5. A device according to claim 4, wherein the filter includes: storage elements for storing, respectively, each coefficient ($h_{mi}$) of each coefficient set; a plurality of multipliers (X) each corresponding to a respective time order of the filter; and a plurality of switches $S_m$ each being connected between a respective one of the multipliers and the storage elements of the coefficients ($h_{mi}$) of different coefficient sets having the same time rank.

6. A device according to claim 1, wherein for each coefficient set, the transmission characteristic of the digital filter within a predetermined tolerance range corresponds to the inverse of the frequency spectrum of the spatial intensity distribution of the transmitted light beam for a predetermined region of the distance from the device.

7. A device according to claim 1, wherein for each coefficient set, the transmission characteristic of the digital filter has defined deviations from the inverse of the frequency spectrum of the spatial intensity distribution of the transmitted light beam in order to compensate for component-dictated distortions of the received signals, which deviations correspond to the inverse functions of the components.

8. A device according to claim 7, wherein the signal-dictated distortion is produced by a signal-distorting component in the receiving element.

9. A device according to claim 1, wherein the n-bit analog-digital converter has a word width in a range of $8 \leq n \leq 12$.

10. A device according to claim 1, wherein the device is a bar code reading device in which the transmitting element comprises a laser and the receiving element includes a photodiode and an amplifier coupled to the photodiode for amplifying the received signal.

* * * * *